(12) United States Patent
Yamasaki et al.

(10) Patent No.: US 8,432,973 B2
(45) Date of Patent: Apr. 30, 2013

(54) INTERPOLATION FRAME GENERATION APPARATUS, INTERPOLATION FRAME GENERATION METHOD, AND BROADCAST RECEIVING APPARATUS

(75) Inventors: Masaya Yamasaki, Ome (JP); Ko Sato, Akishima (JP); Keiko Hirayama, Tokyo (JP); Yohei Hamakawa, Fussa (JP); Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 365 days.

(21) Appl. No.: 12/817,925

(22) Filed: Jun. 17, 2010

(65) Prior Publication Data

US 2010/0245674 A1    Sep. 30, 2010

Related U.S. Application Data

(63) Continuation of application No. PCT/JP2008/070245, filed on Oct. 30, 2008.

(30) Foreign Application Priority Data

Dec. 26, 2007  (JP) ................................. 2007-335348

(51) Int. Cl.
*H04B 1/66*    (2006.01)
(52) U.S. Cl.
USPC ............ 375/240.16; 375/240.15; 375/240.14; 375/240.12; 382/238; 382/236; 348/699
(58) Field of Classification Search ............. 375/240.16, 375/240.15, 240.14, 240.12; 382/238, 236; 348/699
See application file for complete search history.

(56) References Cited

U.S. PATENT DOCUMENTS 5,754,237 A    5/1998   Jung
5,793,430 A    8/1998   Hackett et al.
(Continued)

FOREIGN PATENT DOCUMENTS

EP    0734175    9/1996
EP    0735747    10/1996
(Continued)

OTHER PUBLICATIONS

International Search Report dated Dec. 22, 2008 for application No. PCT/JP2008/070245, entitled "Interpolation Frame Generation Apparatus, Interpolation Frame Generation Method, and Broadcast Receiving Apparatus".

(Continued)

*Primary Examiner* — Shawn An
(74) *Attorney, Agent, or Firm* — Blakely, Sokoloff, Taylor & Zafman LLP

(57) ABSTRACT

According to one embodiment, an interpolation frame generation apparatus generates an interpolation frame image to be inserted between continuous frame images. The interpolation frame generation apparatus includes a motion vector detection module and a generation module. The motion vector detection module is configured to execute block matching processing in each of a plurality of blocks included in the continuous frame images and specify one motion vector on an interpolation frame. The generation module is configured to, for an interpolation block in which the motion vector detection module specifies one motion vector, generate an interpolation frame image based on the motion vector, and for an interpolation block in which the motion vector detection module does not specify one motion vector, generate an interpolation frame image based on the frame image containing no motion vector component.

5 Claims, 10 Drawing Sheets

U.S. PATENT DOCUMENTS

| | | | |
|---|---|---|---|
| 7,460,172 B2 | 12/2008 | Min | |
| 7,692,725 B2 * | 4/2010 | Hirotani et al. | 348/565 |
| 2004/0046891 A1 | 3/2004 | Mishima et al. | |
| 2004/0227851 A1 | 11/2004 | Min | |
| 2004/0240551 A1 | 12/2004 | Itoh et al. | |
| 2005/0100095 A1 | 5/2005 | Itoh et al. | |
| 2005/0271144 A1 * | 12/2005 | Yoshiwara | 375/240.16 |
| 2006/0222077 A1 | 10/2006 | Ohwaki et al. | |
| 2007/0133686 A1 * | 6/2007 | Lee et al. | 375/240.16 |

FOREIGN PATENT DOCUMENTS

| | | |
|---|---|---|
| JP | 01-176178 | 7/1989 |
| JP | 01-179584 | 7/1989 |
| JP | 06-217263 | 8/1994 |
| JP | 07-177501 | 7/1995 |
| JP | 10-233997 | 9/1998 |
| JP | 2001-24988 | 1/2001 |
| JP | 2004-343715 | 12/2004 |
| JP | 2007-60192 | 3/2007 |
| JP | 2007-174455 | 7/2007 |

OTHER PUBLICATIONS

European Search Report and European Search Opinion Dated Dec. 6, 2010, European Patent Application No. 08865230.0.

* cited by examiner

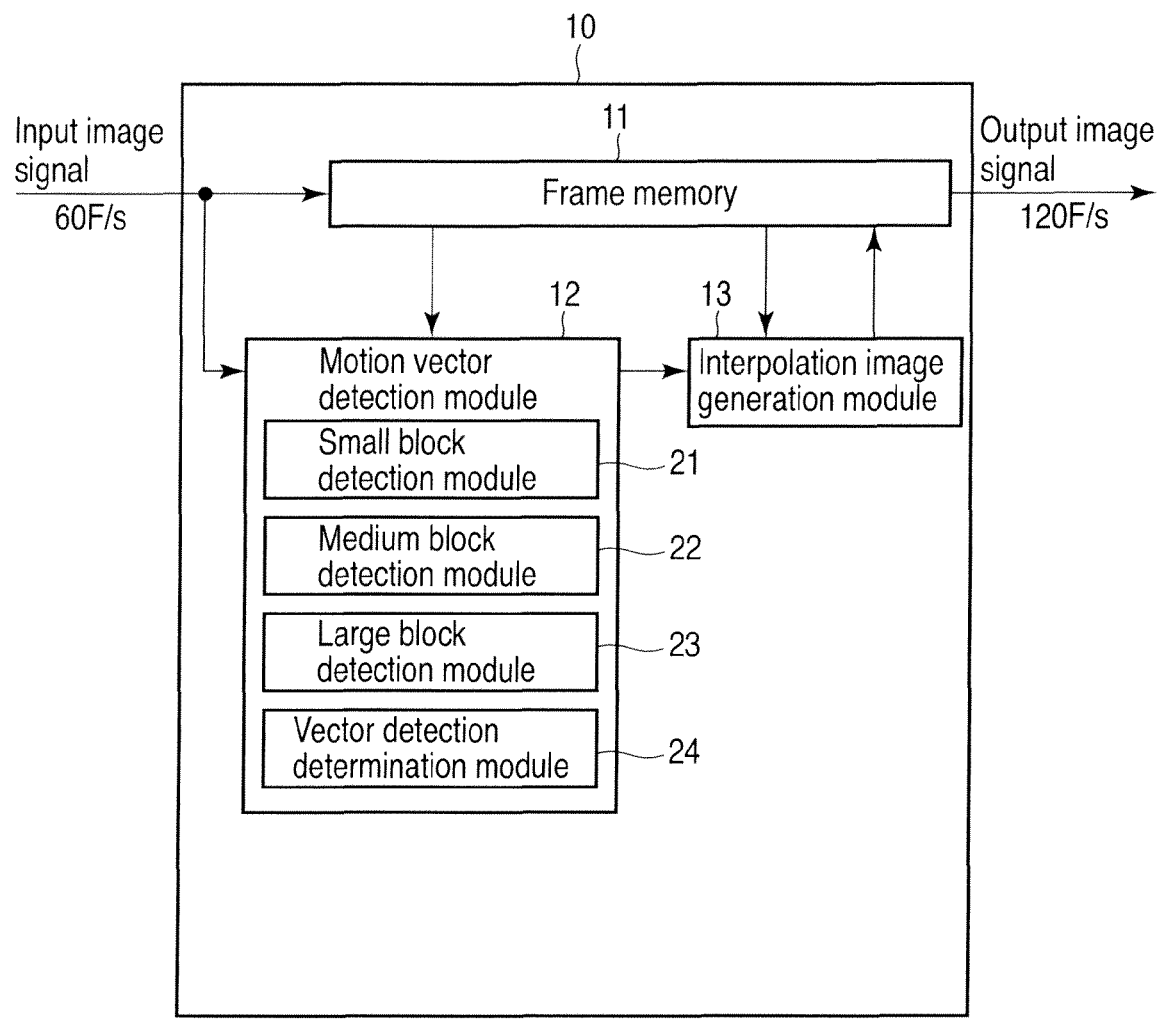
F I G. 1

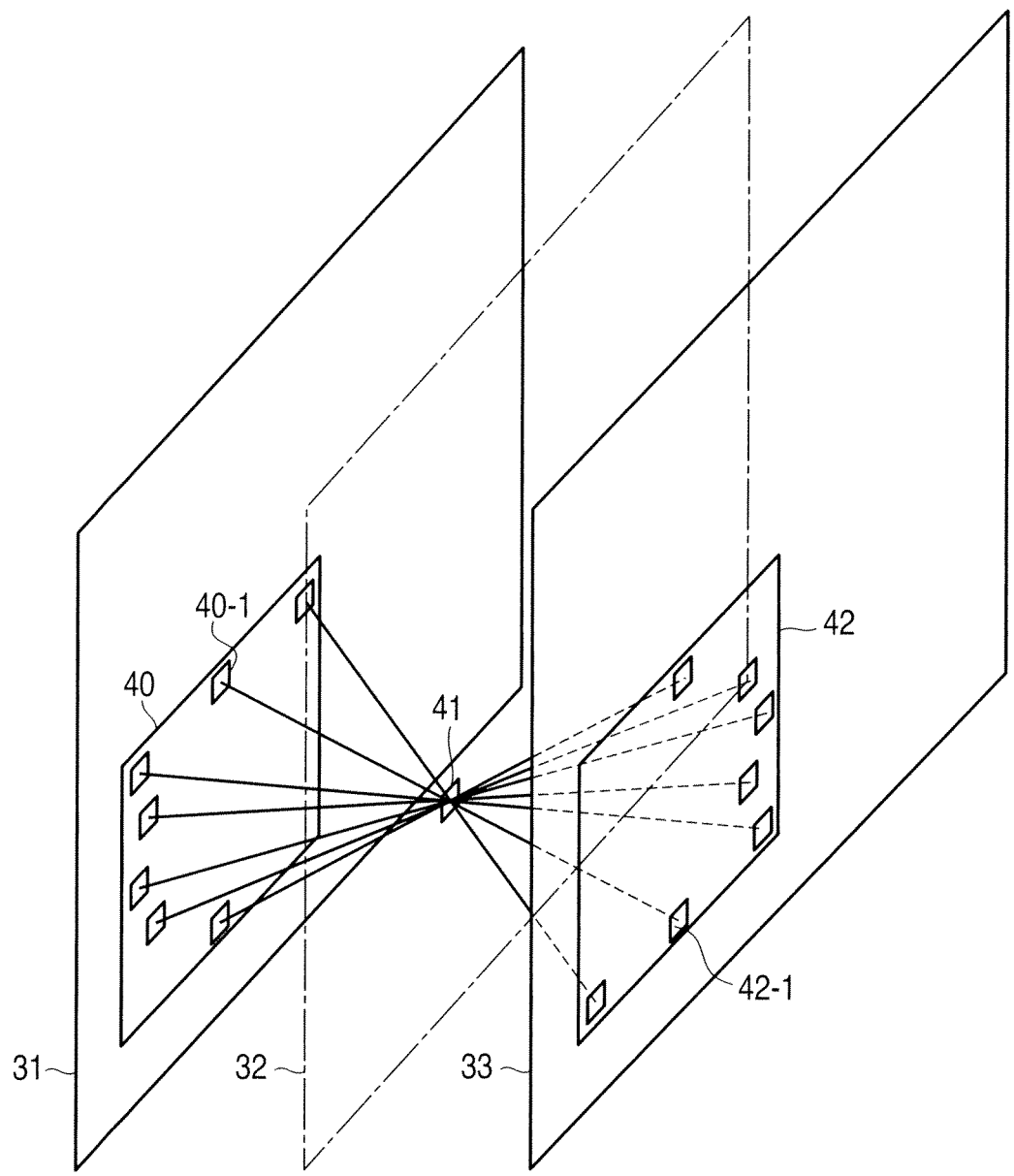
F I G. 2

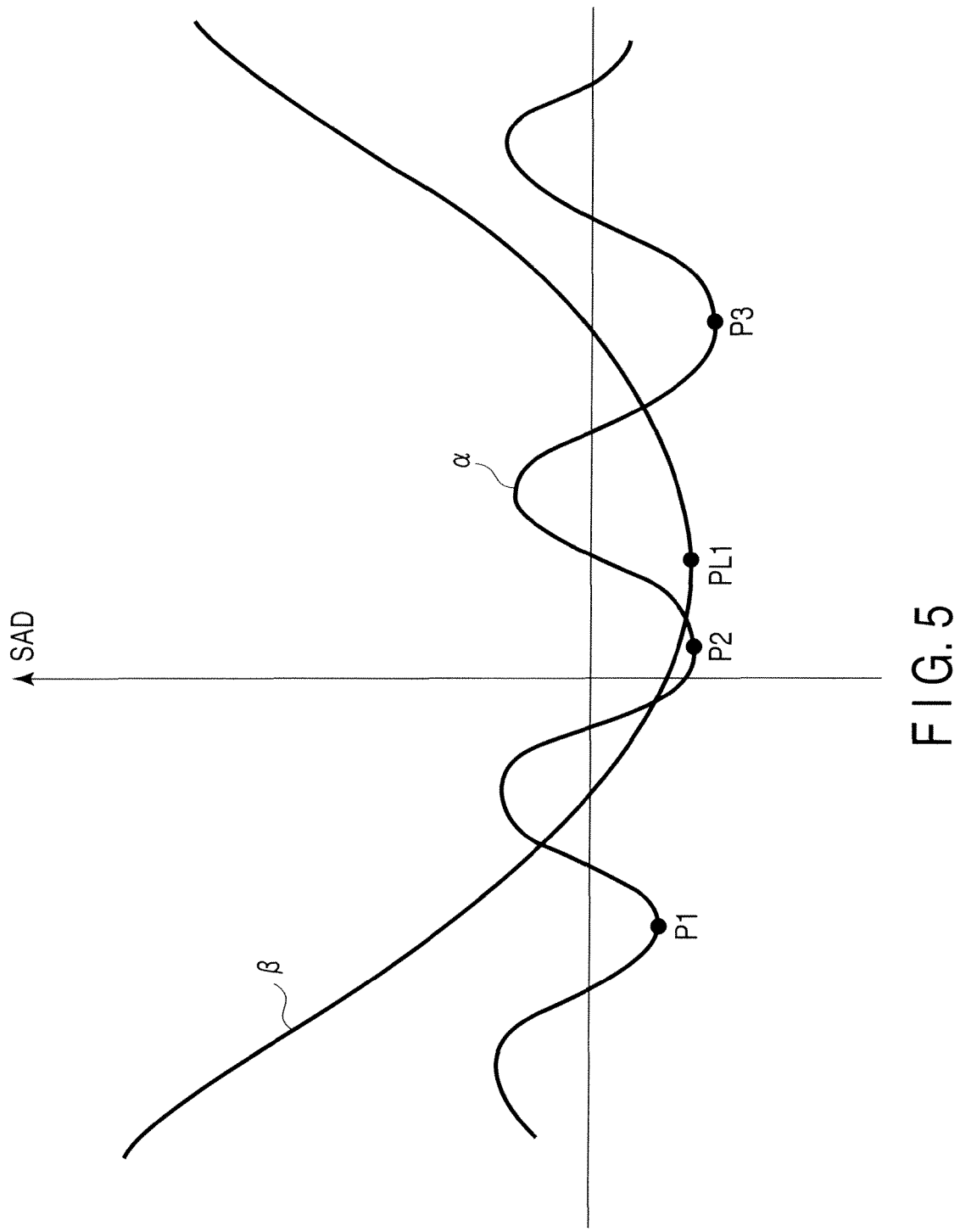
F I G. 5

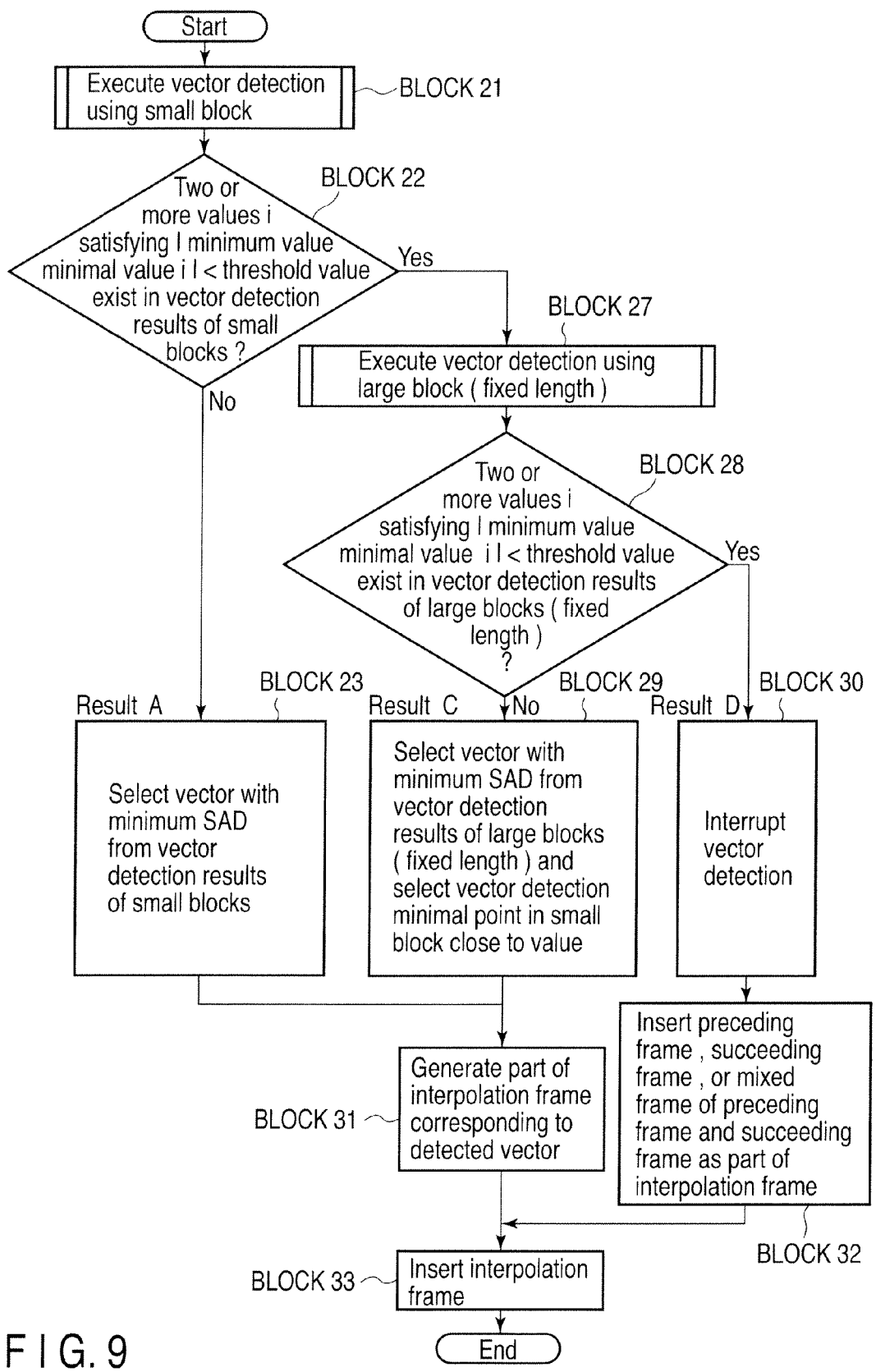
F I G. 9

INTERPOLATION FRAME GENERATION APPARATUS, INTERPOLATION FRAME GENERATION METHOD, AND BROADCAST RECEIVING APPARATUS

CROSS REFERENCE TO RELATED APPLICATIONS

This is a Continuation Application of PCT Application No. PCT/JP2008/070245, filed Oct. 30, 2008, which was published under PCT Article 21(2) in English.

This application is based upon and claims the benefit of priority from prior Japanese Patent Application No. 2007-335348, filed Dec. 26, 2007, the entire contents of which are incorporated herein by reference.

FIELD

Embodiments described herein relate generally to an interpolation frame generation apparatus, interpolation frame generation method, and broadcast receiving apparatus, which detect a motion vector by block matching processing and perform interpolation processing using the motion vector.

BACKGROUND

When a liquid crystal display device (LCD) displays a moving image, it displays a frame image (to be simply referred to as a frame hereinafter) at a rate of, e.g., 60 frames/sec. The frame is a sequential scanning signal obtained by interlaced processing of, e.g., 60 fields/sec. The LCD continues to display a frame during 1/60 sec.

In viewing such an image displayed on the LCD, the human eye perceives an immediately preceding frame image as an afterimage. For this reason, a moving object in the image may get blurred, or its motion may seem unnatural. To prevent such blur in a moving image, a method is disclosed, which displays a moving image while inserting an interpolation frame between two continuous frames.

Jpn. Pat. Appln. KOKAI Publication No. 2007-60192 discloses an interpolation frame generation apparatus which detects a motion vector and generates an interpolation frame using it, thereby more clearly displaying a moving image.

However, the technique disclosed in Jpn. Pat. Appln. KOKAI Publication No. 2007-60192 always obtains a motion vector even when it is undetectable because of the motion of an image pattern. If the detected motion vector is inaccurate, the image quality may degrade.

BRIEF DESCRIPTION OF THE DRAWINGS

A general architecture that implements the various features of the embodiments will now be described with reference to the drawings. The drawings and the associated descriptions are provided to illustrate embodiments and not to limit the scope of the invention.

FIG. 1 is an exemplary block diagram showing the arrangement of an interpolation frame generation apparatus according to one embodiment;

FIG. 2 is an exemplary view showing block matching processing of the interpolation frame generation apparatus according to the embodiment;

FIG. 5 is an exemplary graph showing a SAD characteristic obtained by block matching processing using a fixed-length block and a variable-length block in the interpolation frame generation apparatus according to the embodiment;

FIG. 9 is an exemplary flowchart for explaining motion vector detection processing using a small block and a large block in the interpolation frame generation apparatus according to the embodiment;

DETAILED DESCRIPTION

Figure 3:
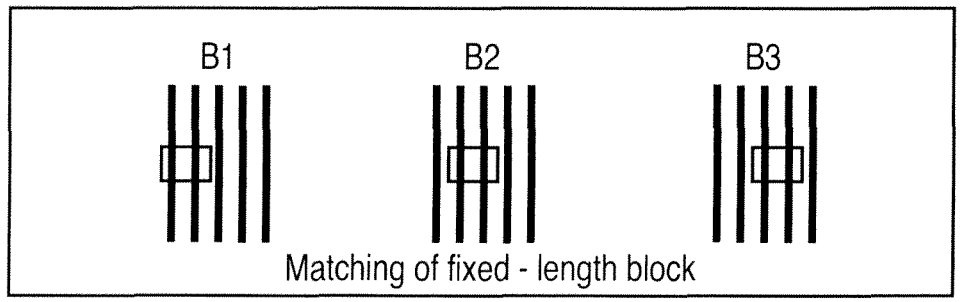
FIG. 3 is an exemplary view showing a fixed-length block in the interpolation frame generation apparatus according to the embodiment.

Various embodiments will be described hereinafter with reference to the accompanying drawings.

In general, according to one embodiment, an interpolation frame generation apparatus generates an interpolation frame image to be inserted between continuous frame images. The interpolation frame generation apparatus includes a motion vector detection module and a generation module. The motion vector detection module is configured to execute block matching processing in each of a plurality of blocks included in the continuous frame images and specify one motion vector on an interpolation frame The generation module is configured to, for an interpolation block in which the motion vector detection module specifies one motion vector, generate an interpolation frame image based on the motion vector, and for an interpolation block in which the motion vector detection module does not specify one motion vector, generate an interpolation frame image based on the frame image containing no motion vector component.

FIG. 1 is a block diagram showing an example of the arrangement of an interpolation frame generation apparatus (interpolation frame generation system) according to one embodiment.

<Interpolation Frame Generation Apparatus According to One Embodiment>

(Arrangement)

An example of the arrangement of an interpolation frame generation apparatus according to one embodiment will be described first with reference to the accompanying drawing. As shown in FIG. 1, an interpolation frame generation apparatus 10 according to one embodiment has a frame memory 11 which receives an input image signal, a motion vector detection module 12 which receives the input image signal from the input terminal and the frame memory 11, and an interpolation image generation module 13 which receives a motion vector from the motion vector detection module 12 and the input image signal from the frame memory 11 and generates an interpolation image.

The motion vector detection module 12 includes, e.g., a small block detection module 21 which detects a motion vector for a small block, a medium block detection module 22 which detects a motion vector for a medium block (variable length), a large block detection module 23 which detects a motion vector for a large block (fixed length), and a vector detection determination module 24 which collectively determines whether the detection modules have detected motion vectors.

<Interpolation Frame Generation Processing of Interpolation Frame Generation Apparatus According to One Embodiment>

Interpolation frame generation processing of the interpolation frame generation apparatus according to the embodiment will be described next in detail with reference to the accompanying drawing. FIG. 2 is an explanatory view showing an example of block matching processing of the interpolation frame generation apparatus according to the embodiment.

(Block Matching Processing of Fixed-Length Block and Variable-Length Block)

First, block matching processing of a fixed-length block and a variable-length block will be described with reference to the accompanying drawing.

Block Matching Processing

As described above, the interpolation image generation module 13 generates an interpolation frame image based on an inter-frame motion vector detected by the motion vector detection module 12. A motion vector is detected as the direction and distance of the motion of an object by matching image blocks between two preceding and succeeding frames or more input frames. A new interpolation frame to be located between the two input frames is created using the motion vector of each block and inserted between the input frames, thereby increasing the number of frames and displaying a moving image.

Block matching is a method of detecting, one by one, which image block 40-1 of a predetermined size in a region 40 of a frame 31 matches which image block 42-1 of a predetermined size in a region 42 of a succeeding frame 33, as shown in FIG. 2.

For this purpose, the difference between corresponding pixels is calculated between an image block of the preceding frame and an image block of the succeeding frame. An image block of the succeeding frame, in which the sum (SAD: Sum of Absolute Difference) of differences is minimum, is detected as an image block most similar to the image block of the preceding frame. The difference of the positions of the most similar image blocks between the preceding frame and the succeeding frame is detected as a motion vector.

Fixed-Length Block (Small Block) and Variable-Length Block (Large Block)

The block matching processing is not necessarily done using the fixed-length block 40-1 having a fixed block size, as shown in FIG. 2. It is sometimes more effective to use variable-length block having variable block sizes.

FIG. 3 is an explanatory view showing an example of a fixed-length block in the interpolation frame generation apparatus according to the embodiment. Assume that a periodical pattern such as a vertical stripe pattern exists in each input frame when estimating the motion of an object based on block matching using SAD, as shown in FIG. 3. When a fixed-length image block is used in the periodical pattern, it is impossible to estimate an accurate motion vector based only on the SAD value.

FIG. 5 is a graph showing a SAD characteristic obtained by block matching processing using a fixed-length block and a variable-length block in the interpolation frame generation apparatus.

In the graph of FIG. 5, a SAD value a of the fixed-length block exhibits motion vector candidates of a plurality of indistinguishable minimal values P1, P2, and P3, and block matching is difficult.

Figure 4:
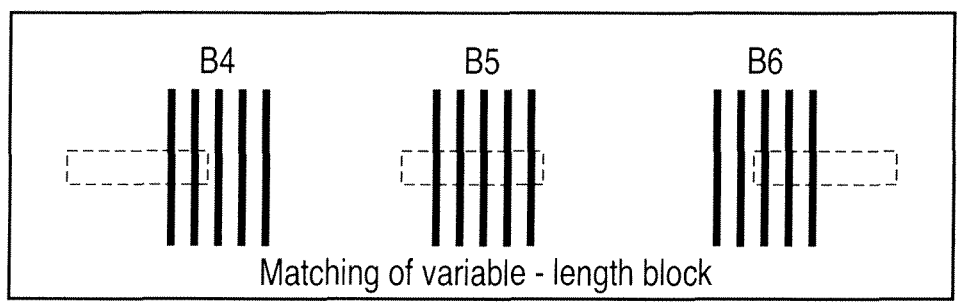
FIG. 4 is an exemplary view showing matching processing using a variable-length block in the interpolation frame generation apparatus according to the embodiment.

FIG. 4 is an explanatory view showing an example of matching processing using a variable-length block in the interpolation frame generation apparatus according to the embodiment. Matching processing is performed using a variable-length block which is sufficiently large with respect to a periodical pattern such as a vertical stripe pattern shown in FIG. 4. In block matching using the variable-length block, a SAD value β of the variable-length block in the graph of FIG. 5 exhibits not a plurality of minimal values but only one minimal value PL1. Hence, block matching is not difficult.

For the interpolation frame creation method which detects a motion vector by block matching, it is effective to use at least two blocks of different sizes. Normally, a motion vector detected using a smaller one of the two blocks is used. If a plurality of motion vector candidates are detected upon vector detection using the small block, a vector detected using the large block is referred to. This allows to select a genuine motion vector candidate from the plurality of motion vector candidates detected using the small block.

In the graph shown in FIG. 5, it is possible to determine, by referring to the SAD value β of the variable-length block, that the genuine motion vector candidate is the minimal value P2 closest to the minimal value PL1. This improves the detection accuracy of a motion vector in a video image that includes a periodical pattern.

Size Determination of Variable-Length Block (Large Block)

An example of a reference to determine an appropriate block size a variable-length block (large block) for motion detection will be described.

As shown in FIG. 3, the rectangular regions of small blocks B1, B2, and B3 include identical images which cannot be distinguished. However, as shown in FIG. 4, the rectangular regions of large blocks B4, B5, and B6 whose size covers the whole width of the periodical repetitive pattern include different images. It is therefore possible to uniquely detect a correct motion vector.

Hence, the appropriate size of the large block in motion detection is a size that is large enough not to be affected by a periodical repetitive pattern and is also not larger than necessary to include a plurality of objects with motions.

As a detailed method of the width of a periodical repetitive pattern, "a region where a plurality of motion vector candidates are generated" is detected. Then, "the size of the variable-length block (large block)" is determined based on the width of the region.

That is, a determination method based on, e.g.,

"a region where a plurality of motion vector candidates are generated"≈"the size of the variable-length block (large block)"

or

"a region where a plurality of motion vector candidates are generated"≈"the size of the variable-length block (large block)"+a (constant)

is preferable. However, the embodiment is not limited to this.

More specifically, as another method of calculating the width of a periodical repetitive pattern, in vector detection using the small block, the number of times of continuous occurrence of a phenomenon that a plurality of reliable motion vector candidates are found (i.e., an indeterminate state in which no vector can uniquely be detected) is measured, and a width corresponding to it is determined, or the number of times of repetition of a unit pattern on a line of an input image is measured, and a width corresponding to it is determined.

(Explanation of Outline)

In the embodiment, if motion vector determination has failed in spite of repetitive motion vector detection, further detection is abandoned. Instead, an interpolation frame image is generated and used without referring to a motion vector.

That is, if a motion vector is detectable, it is used. If no motion vector is detectable, a stable interpolation frame image based on the preceding frame image or succeeding frame image is generated and used without detecting a poor-quality motion vector.

Figure 6:
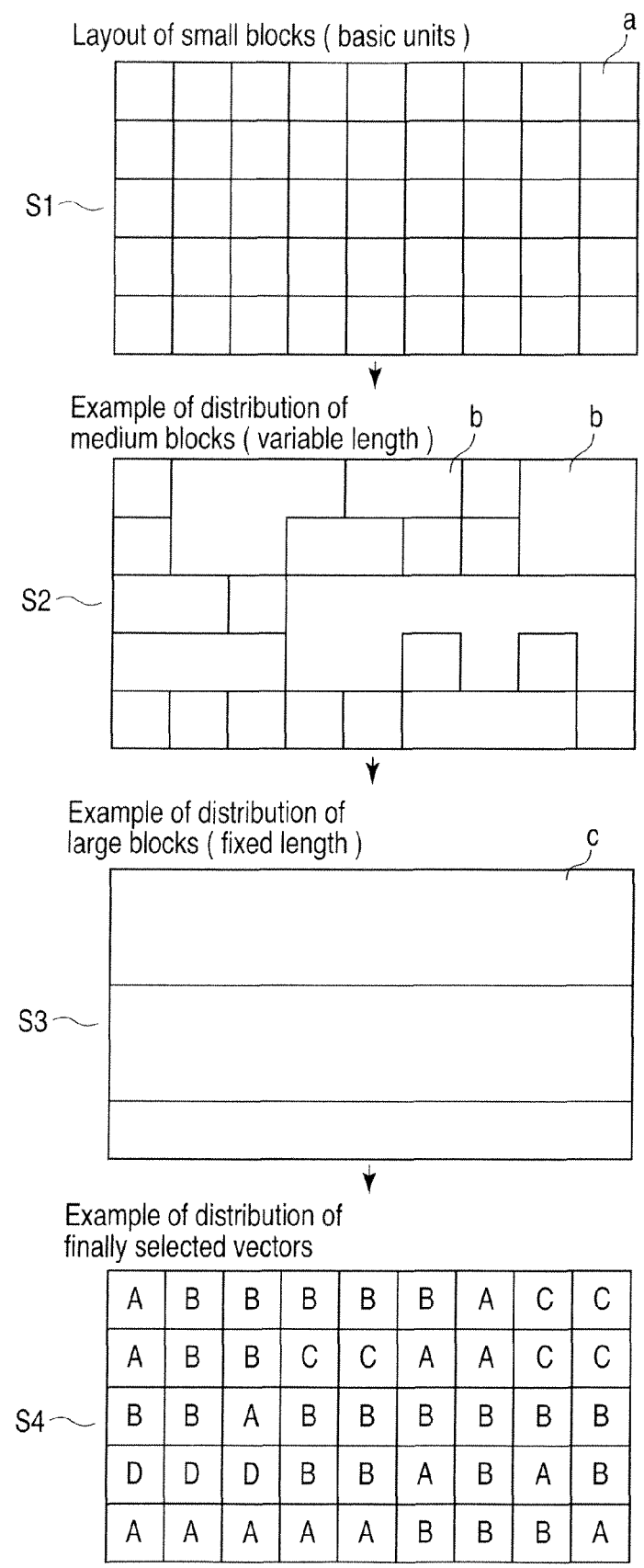
FIG. 6 is an exemplary view for explaining matching processing of a frame using a small block, matching processing using a medium block (variable length), and matching processing using a large block (fixed length) in the interpolation frame generation apparatus according to the embodiment, and the distribution of finally selected vectors.

As a detailed example, four steps which yield the following results are applicable, as shown in FIG. 6. FIG. 6 is a view for explaining matching processing of a frame using a small block, matching processing using a medium block (variable length), and matching processing using a large block (fixed length) in the interpolation frame generation apparatus according to the embodiment, and the distribution of finally selected vectors.

FIG. 6 explains the following four steps.

1) Motion vector detection by small blocks a: Since the vector detection results of the small blocks themselves are reliable, a vector having a minimum SAD is selected from the vector detection results of the small blocks a (step S1).

2) Motion vector detection using medium blocks (variable length) b: Since the vector detection results of the medium blocks (variable length) b are reliable, a vector having a minimum SAD is selected from the vector detection results of the medium blocks (variable length) b, and a vector detection minimal point in a small block a close to the value is selected (step S2).

3) Motion vector detection using large blocks (fixed length) c: Since the vector detection results of the large blocks (fixed length) c are reliable, a vector having a minimum SAD is selected from the vector detection results of the large blocks (fixed length) c, and a vector detection minimal point in a small block a close to the value is selected (step S3).

4) An example of the distribution of finally selected vectors: The vectors in the respective blocks of one frame image are classified into four results A to D, including a case in which no motion vector is used (step S4).

Result A: Result A of motion vector detection using the small block a

Result B: Result B of motion vector detection using the medium block b

Result C: Result C of motion vector detection using the large block c

Result D: Result D of stopped motion vector detection

In the result D, vector detection is stopped upon determining that accurate vector detection is difficult because no reliable vector is detectable in steps S1, S2, and S3. An instruction to generate an interpolation frame image without using a motion vector is sent to the interpolation image generation module 13.

Figure 7:
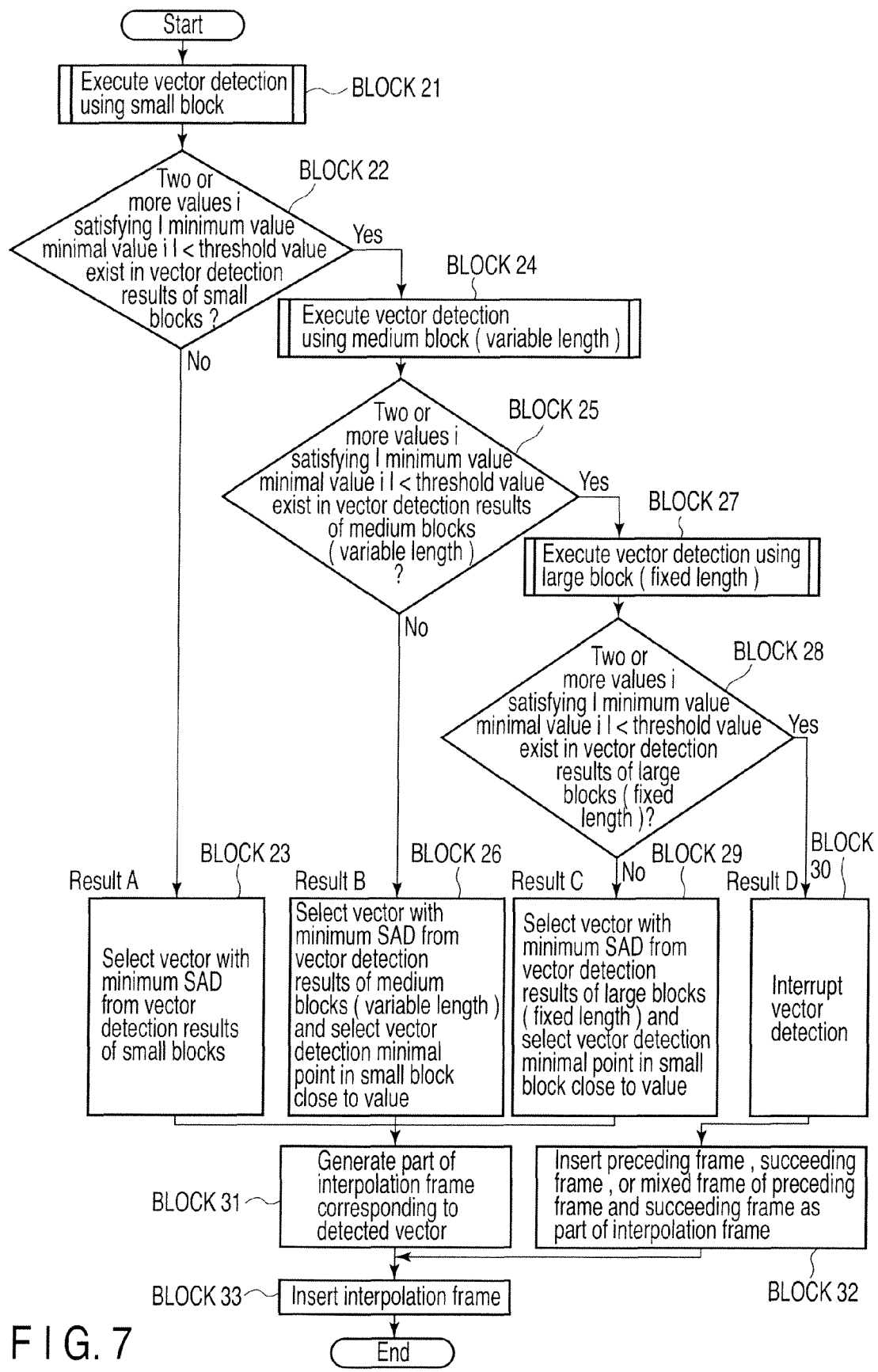
FIG. 7 is an exemplary flowchart for explaining motion vector detection processing using a small block, medium block, and large block in the interpolation frame generation apparatus according to the embodiment.

(Detailed Description of Interpolation Frame Generation Processing Using Flowchart: FIG. 7)

Interpolation frame generation processing will be described below in detail with reference to the flowchart in FIG. 7. The flowchart in FIG. 7 explains an example of motion vector detection processing using a small block, medium block, and large block in the interpolation frame generation apparatus according to the embodiment.

The blocks of the flowcharts in FIGS. 7 to 10 to be described below can be replaced with circuit blocks. Hence, all the blocks of the flowcharts can be redefined as circuit blocks.

Motion vector detection to be executed in the order of "small block, medium block, and large block" will be described here.

The motion vector detection module 12 receives an image signal of 60 frames/sec as an input image signal. The small block detection module 21 in the motion vector detection module 12 executes motion vector detection for the image signal using the small block a, as shown in step S1 of FIG. 6. In this case, since the vector detection results of the small blocks themselves are reliable, a vector having a minimum SAD is selected from the vector detection results of the small blocks a (block 21). If the vector detection results of the small blocks include only one value that satisfies

|minimum value−minimal value $i$|<(threshold value), one motion vector is specified (block 22). In this case, the process advances to result A. The small block detection module 21 selects a motion vector with a minimum SAD from the detection results of the small blocks (block 23).

However, if two or more values satisfy

|minimum value−minimal value $i$|<(threshold value), no motion vector can be specified.

Then, the medium block detection module 22 executes vector detection using medium blocks having variable lengths, as shown in step S2 of FIG. 6 (block 24). The block length is determined by, e.g., detecting "a region where a plurality of motion vector candidates are generated", and determining "the size of the variable-length block (medium block)" based on the width of the region.

If the medium block detection module 22 can specify, among the detection results, only one value that satisfies

|minimum value−minimal value $i$|<(threshold value), one motion vector is specified (block 25). In this case, the process advances to result B. The medium block detection module 22 selects a motion vector with a minimum SAD from the detection results of the medium blocks and selects a vector detection minimal point in a small block close to the value (block 26).

However, if two or more values satisfy

|minimum value−minimal value $i$|<(threshold value), no motion vector can be specified.

Then, the large block detection module 23 executes vector detection using large blocks having a fixed length, as shown in step S3 of FIG. 6 (block 27).

If the large block detection module 23 can specify, among the detection results, only one value that satisfies

|minimum value−minimal value $i$|<(threshold value), one motion vector is specified. In this case, the process advances to result C. The large block detection module 23 selects a motion vector with a minimum SAD from the detection results of the large blocks and selects a vector detection minimal point in a small block close to the value (block 29).

However, if two or more values satisfy

|minimum value−minimal value $i$|<(threshold value), no motion vector can be specified (block 28).

Determining that only an inaccurate motion vector will be detected by further vector detection, the vector detection determination module 24 interrupts vector detection (block 30).

The motion vector detected by the small block detection module 21, the motion vector detected by the medium block detection module 22, or the motion vector detected by the large block detection module 23 is supplied to the interpolation image generation module 13. The interpolation image generation module 13 generates part of an interpolation frame image corresponding to the motion vector in cooperation with the frame memory 11 and inserts the interpolation frame image between the preceding frame image and the succeeding frame image (block 31).

On the other hand, when vector detection is interrupted in block 30, the interpolation image generation module 13 generates part of an interpolation frame image containing no motion vector component in cooperation with the frame memory 11 and inserts the interpolation frame image between the preceding frame image and the succeeding frame image. For example, the preceding frame image 31, the succeeding frame image 33, or a mixed frame of the preceding frame image 31 and succeeding frame image 33 shown in FIG. 2 is inserted between the preceding frame image and the succeeding frame image as part of the interpolation frame image (block 32).

This prevents the part of the interpolation frame image from being affected by a motion vector, so the problem of image quality degradation caused by use of an inappropriate interpolation frame image corresponding to an inaccurate motion vector hard to detect is not posed.

As indicated by the selection result distribution in one interpolation screen in step S4 of FIG. 6, an interpolation frame image based on a motion vector detected by the small block is applied in the result A. In the result B, an interpolation frame image based on a motion vector detected by the medium block is applied. In the result C, an interpolation frame image based on a motion vector detected by the large block is applied. In the result D, an interpolation frame image containing no motion vector component is applied. It is therefore possible to provide an appropriate interpolation frame image in each result as a whole.

As described above, the procedure shown in FIG. 6 enables to execute vector detection processing while flexibly switching the results A to D adaptively for each part and a motion vector detected using a block of a size appropriately selected in accordance with the pattern of an input image. As a result, it is possible to detect a motion vector for generating a high-quality interpolation image.

An example of the block sizes in one interpolation screen and the distribution of finally selected vectors is shown in FIG. 6 as the operation result.

Reconfirmation processing

As another embodiment, in block 28, if two or more values satisfy

|minimum value−minimal value $i$|<(threshold value), no motion vector can be specified. Instead of immediately interrupting vector detection at this point in time, an opportunity of reconfirming "|minimum value−minimal value $i$| and (threshold value)" in each of blocks S22, S25, and S28 is preferably provided.

That is, the vector detection determination module 24 preferably provides an opportunity of reconfirming "|minimum value−minimal value $i$| and (threshold value)" in each step by calculating the sum again or making comprehensive consideration. For example, the (threshold value) is preferably given some tolerance so that the motion vector detected by, e.g., the medium block detection module 22 can be restored and used.

Processing order

In the above-described embodiment, small block detection processing, medium block detection processing, and large block detection processing are executed in this order. However, the order is not limited to this. A not so largely different detection result may be obtained even when the processing is executed in the order of large block detection processing, medium block detection processing, and small block detection processing in consideration of the magnitudes of the threshold values of small block detection processing, medium block detection processing, and large block detection processing.

More specifically, even when large block detection processing is performed first, not all blocks are detected by the large block if, e.g., the threshold value is large. Which one of small block detection processing, medium block detection processing, and large block detection processing is necessary for a block to detect a motion vector is determined by the threshold value rather than by the order. For this reason, it is preferable to arbitrarily change the order of small block detection processing, medium block detection processing, and large block detection processing.

Figure 8:
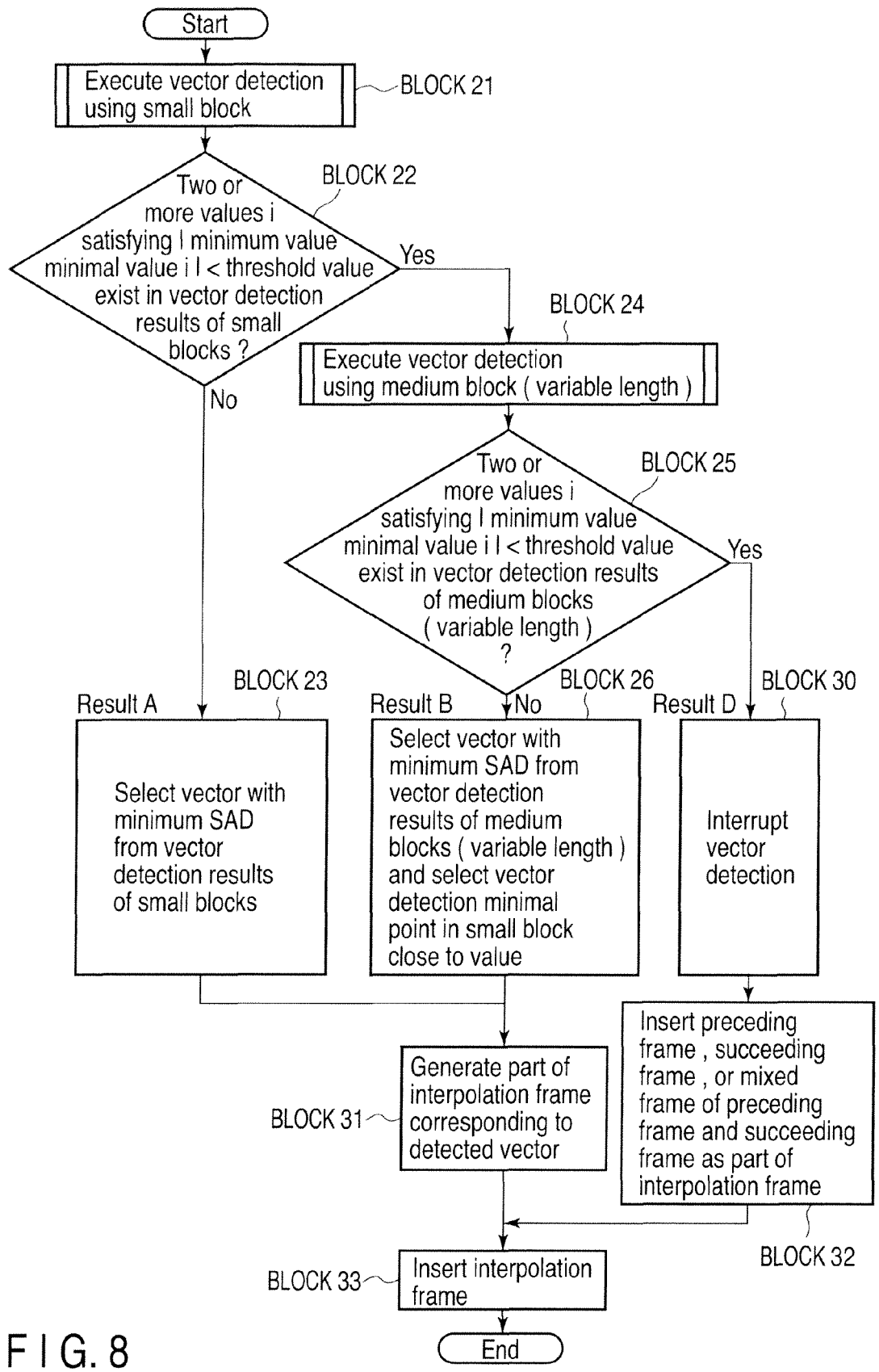
FIG. 8 is an exemplary flowchart for explaining motion vector detection processing using a small block and a medium block in the interpolation frame generation apparatus according to the embodiment.
Figure 10:
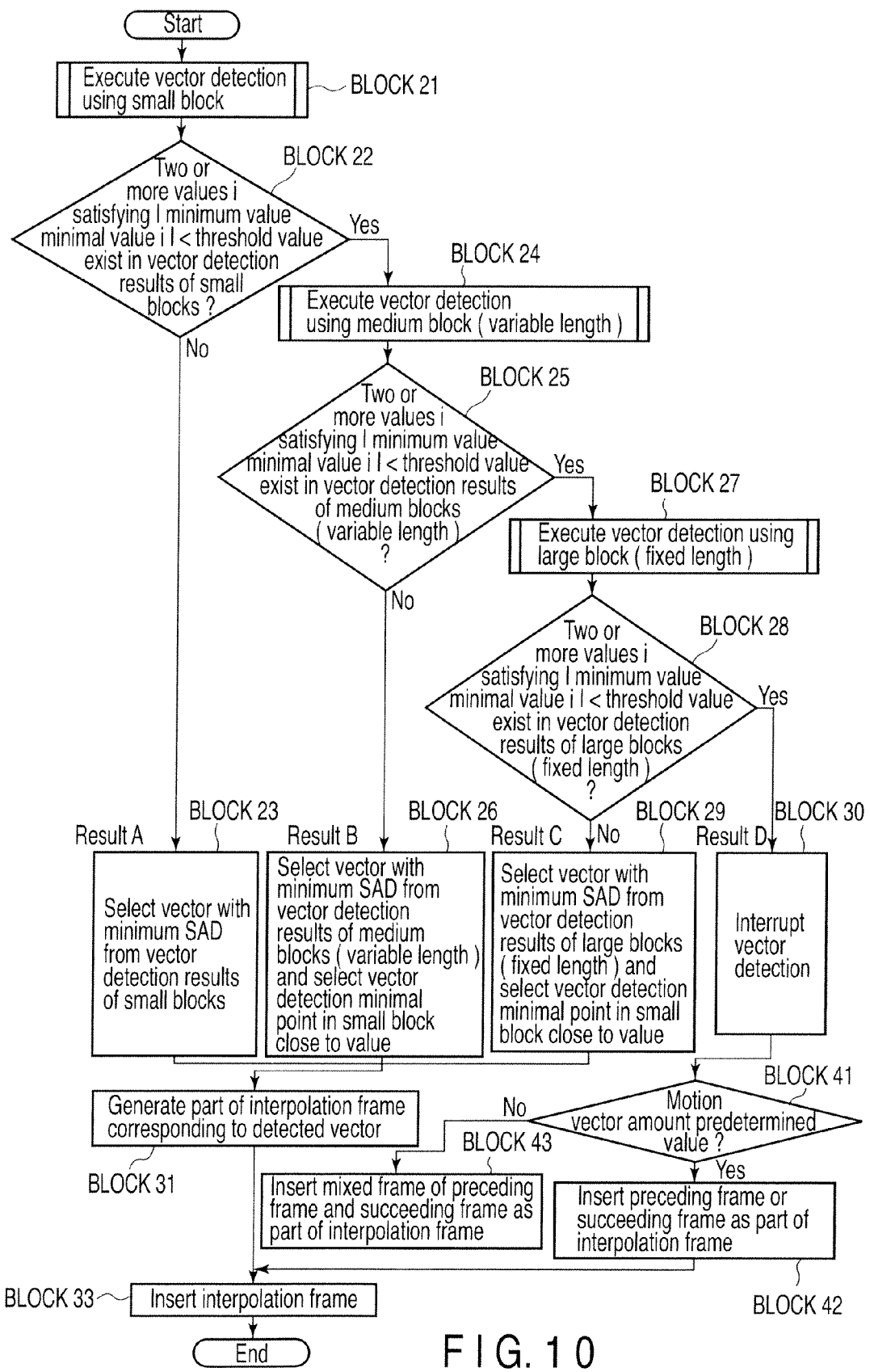
FIG. 10 is an exemplary flowchart for explaining processing of generating an interpolation frame according to a motion vector amount in the interpolation frame generation apparatus according to the embodiment.

(Detailed Description of Interpolation Frame Generation Processing Using Flowcharts: FIGS. 8, 9, and 10)

"Small Block and Medium Block"

FIG. 8 is a flowchart for explaining an example of motion vector detection processing using a small block and a medium block in the interpolation frame generation apparatus according to the embodiment.

A case in which motion vectors are detected in the order of "a small block and a medium block" will be explained here. That is, large block detection processing is not essential. Only small block detection processing and medium block detection processing suffice for equivalent detection processing.

All the blocks of the flowchart in FIG. 8 are common to the flowchart in FIG. 7, and a description thereof will not be repeated here.

"Small Block and Large Block"

FIG. 9 is a flowchart for explaining an example of motion vector detection processing using a small block and a large block in the interpolation frame generation apparatus according to the embodiment.

A case in which motion vectors are detected in the order of "a small block and a large block" will be explained here. That is, medium block (variable length) detection processing is not essential. Only small block detection processing and large block detection processing suffice for equivalent detection processing.

All the blocks of the flowchart in FIG. 9 are common to the flowchart in FIG. 7, and a description thereof will not be repeated here.

(Detailed Description of Interpolation Frame Generation Processing Using Flowchart: FIG. 10)

FIG. 10 is a flowchart for explaining an example of processing of generating an interpolation frame according to a motion vector amount in the interpolation frame generation apparatus according to the embodiment.

Many blocks of the flowchart in FIG. 10 are common to the flowchart in FIG. 7, and a description thereof will not be repeated here.

Assume that the vector detection determination module 24 determines in block 30 that detection is interrupted. When the motion vector amount in a block of interest is equal to or larger than a predetermined value (block 41), the possibility of image disturbance is considered to be high. Hence, the interpolation image generation module 13 generates an interpolation frame image which is the same as the preceding frame image or succeeding frame image (block 42). If a composite image of the preceding frame and succeeding frame is used as the interpolation frame image when the motion vector amount is large, the image is disturbed with a high possibility.

On the other hand, if the motion vector amount in the block is smaller than the predetermined value (block 41), the possibility of image disturbance is considered to be low. Hence, a composite image of the preceding frame and succeeding frame is preferably used as the interpolation frame image (block 43).

(Other Embodiments)

Other preferred embodiments will be described below.

In the above embodiment, a technique of increasing the motion vector detection accuracy for a periodical pattern in the horizontal direction of an image has been described. As can easily be supposed, the technique is also effective for increasing the motion vector detection accuracy for a periodical pattern in the vertical direction of an image.

More specifically, the motion vector detection module 12 preferably advances the processing of specifying a motion vector sequentially in a plurality of blocks either in the horizontal direction or vertical direction of the plurality of blocks.

In the above embodiment, simple processing using one kind of large block (fixed length) size has been described. However, it is also preferable to use blocks (fixed length) having a plurality of stages of sizes until reaching a small block as the final motion vector detection target.

<Example of Broadcast Receiving Apparatus Using Interpolation Frame Generation Apparatus of One Embodiment>

Figure 11:
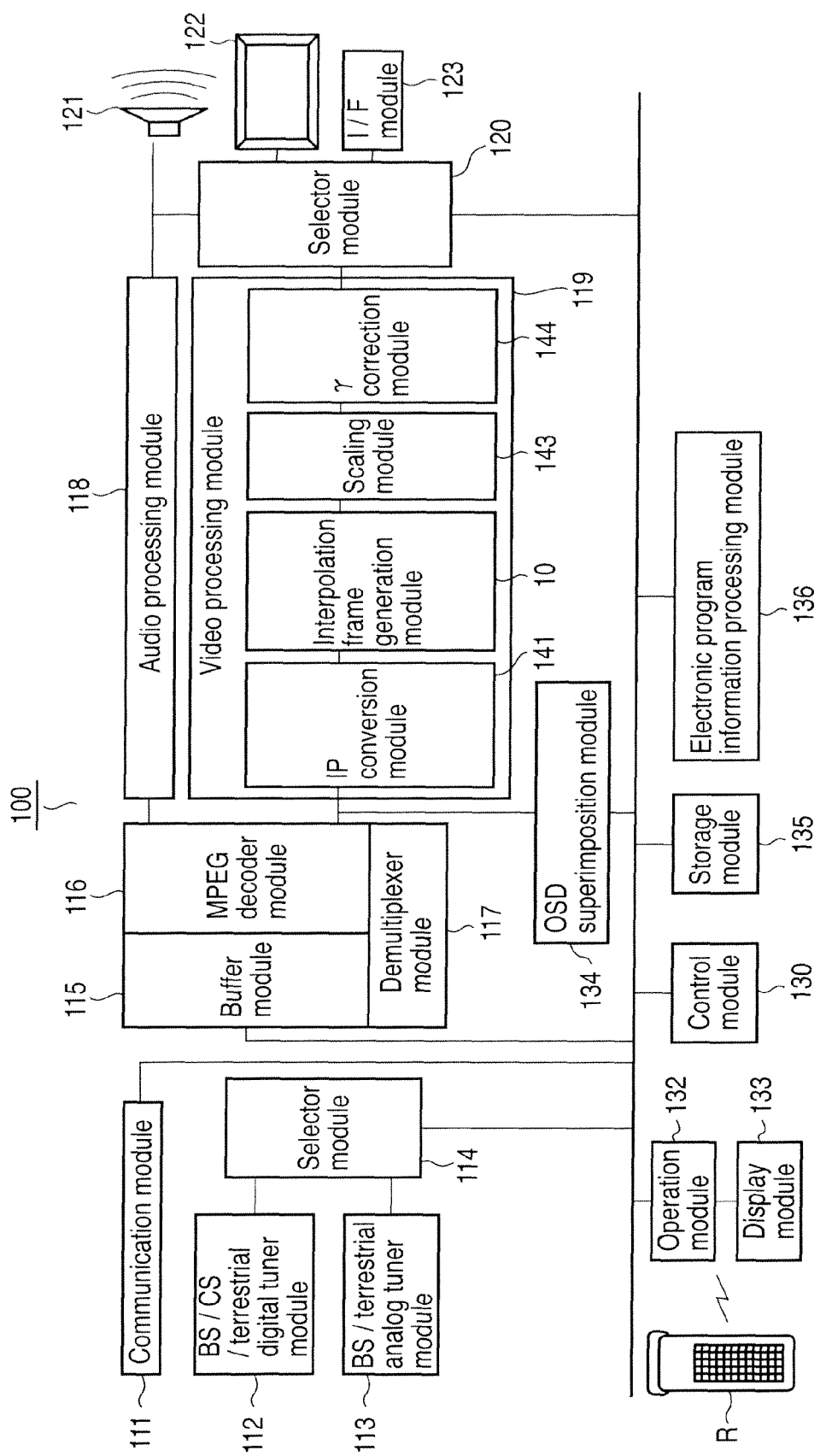
FIG. 11 is an exemplary block diagram showing the arrangement of a broadcast receiving apparatus using the interpolation frame generation apparatus according to the embodiment.

An example of a broadcast receiving apparatus using the interpolation frame generation apparatus according to the embodiment will be described next with reference to the accompanying drawing. FIG. 11 is a block diagram showing an example of the arrangement of a broadcast receiving apparatus using the interpolation frame generation apparatus according to the embodiment.

In a broadcast receiving apparatus 100, the interpolation frame generation apparatus according to the above-described embodiment is preferably used as an interpolation frame generation module 10 of the succeeding stage in a video processing module 119.

(Arrangement and Operation of Broadcast Receiving Apparatus)

An example of the arrangement of a broadcast receiving apparatus such as a digital television apparatus, which is an embodiment of the broadcast receiving apparatus using the interpolation frame generation apparatus of the embodiment, will be described below in detail with reference to the accompanying drawing. FIG. 11 is a block diagram showing an example of the arrangement of a broadcast receiving apparatus such as a digital television apparatus, which is an embodiment of the broadcast receiving apparatus using the interpolation frame generation apparatus.

As shown in FIG. 11, the broadcast receiving apparatus 100 is, e.g., a television apparatus. A control module 130 is connected to the modules via data bus to control the overall operation. The broadcast receiving apparatus 100 includes, as main constituent elements, an MPEG decoder module 116 which constitutes the playback side, and the control module 130 which controls the operation of the apparatus main body. The broadcast receiving apparatus 100 has an input-side selector module 114 and an output-side selector module 120. A BS/CS/terrestrial digital tuner module 112 and a BS/terrestrial analog tuner module 113 are connected to the input-side selector module 114. A LAN or a communication module 111 having a mail function is connected to the data bus.

The broadcast receiving apparatus 100 also includes a buffer module 115 which temporarily stores a demodulated signal from the BS/CS/terrestrial digital tuner module 112, a demultiplexer module 117 which demultiplexes a stored packet as a demodulated signal into signals of different types, the MPEG decoder module 116 which executes MPEG decoding processing for video and audio packets supplied from the demultiplexer module 117 and outputs video and audio signals, and an OSD (On Screen Display) superimposition module 134 which generates a video signal to superimpose operation information or the like and superimposes it on a video signal. The broadcast receiving apparatus 100 also has an audio processing module 118 which, e.g., amplifies the audio signal from the MPEG decoder module 116, the video processing module 119 which receives the video signal from the MPEG decoder module 116 and executes desired video processing, the interpolation frame generation module 10 according to the above-described embodiment, the OSD superimposition module 134, the selector module 120 to select the output destinations of the audio signal and video signal, a speaker module 121 which outputs audio corresponding to the audio signal from the audio processing module 118, a display module 122 which is connected to the selector module 120 and displays, on a liquid crystal display screen or the like, an image corresponding to the supplied video signal, and an interface module 123 which communicates with an external device.

The broadcast receiving apparatus 100 also includes a storage module 135 which records video information and the like from the BS/CS/terrestrial digital tuner module 112 and the BS/terrestrial analog tuner module 113, as needed, and an electronic program information processing module 136 which acquires electronic program information from a broadcast signal and displays it on the screen. These modules are connected to the control module 130 via the data bus. The broadcast receiving apparatus 100 also has an operation module 132 which is connected to the control module 130 via the data bus and receives a user operation or an operation of a remote controller R, and a display module 133 which displays an operation signal. The remote controller R enables almost the same operation as the operation module 132 provided on the main body of the broadcast receiving apparatus 100 and can do various kinds of settings such as a tuner operation.

In the broadcast receiving apparatus 100 having the above-described arrangement, a broadcast signal is input from a receiving antenna to the BS/CS/terrestrial digital tuner module 112, and a channel is selected. The demultiplexer module 117 demultiplexes the demodulated signal in a packet format for the selected channel into packets of different types. Audio and video packets are decoded by the MPEG decoder module 116 so that audio and video signals are supplied to the audio processing module 118 and the video processing module 119, respectively.

In the video processing module 119, for example, an IP conversion module 141 executes image processing of the received video signal by, e.g., converting the interlaced signal into a progressive signal. Additionally, the interpolation frame generation module 10 can provide a stable interpolation image by eliminating the influence of a motion vector hard to detect, as described above. The processed signal is supplied to the selector module 120.

The selector module 120 supplies the video signal to, e.g., the display module 122 in accordance with a control signal from the control module 130 so that the display module 122 displays an image corresponding to the video signal. In addition, the speaker module 121 outputs audio corresponding to the audio signal from the audio processing module 118.

Various kinds of operation information and subtitle information generated by the OSD superimposition module 134 are superimposed on the video signal corresponding to the broadcast signal. An image corresponding to the video signal is displayed on the display module 122 via the video processing module 119.

As described above, in the broadcast receiving apparatus 100, it is possible to further improve the accuracy of the interpolation frame image of the interpolation frame generation module 10 and display a more natural moving image with a smoother motion without any failure.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

What is claimed is:

1. An interpolation frame generation apparatus for generating an interpolation frame image to be inserted between continuous frame images, comprising:
   a motion vector detection module configured to execute block matching processing in each of a plurality of blocks included in the continuous frame images and specify one motion vector on an interpolation frame; and
   a generation module configured to, for an interpolation block in which the motion vector detection module specifies one motion vector, generate an interpolation frame image based on the motion vector, and for an interpolation block in which the motion vector detection module does not specify one motion vector, generate an interpolation frame image based on the frame image containing no motion vector component,
   wherein the motion vector detection module comprises:
      a first detection module configured to divide the frame image into a plurality of first blocks and execute block matching processing in each first block if it is impossible to specify one vector for which a difference between a minimum value and a minimal value of a Sum of Absolute Difference (SAD) value is not more than a predetermined value, determine that no motion vector is detected, and if it is possible to specify one vector for which the difference between the minimum value and the minimal value of the SAD value is not more than the predetermined value, determine that a motion vector is detected;
      a second detection module configured to, for a block in which the first detection module detects no motion vector, divide the frame image into second blocks larger than the first block and execute block matching processing in each second block if it is impossible to specify one vector for which the difference between the minimum value and the minimal value of the SAD value is not more than the predetermined value, determine that no motion vector in the second block is detected, and if it is possible to specify one vector for which the difference between the minimum value and the minimal value of the SAD value is not more than the predetermined value, select a motion vector of the second block; and
      a third detection module configured to, for a block in which the second detection module detects no motion vector, divide the frame image into third blocks larger than the second block and execute block matching processing in each third block if it is impossible to specify one vector for which the difference between the minimum value and the minimal value of the SAD value is not more than the predetermined value, determine that no motion vector in the third block is detected, and if it is possible to specify one vector for which the difference between the minimum value and the minimal value of the SAD value is not more than the predetermined value, select a motion vector of the third block.

2. An interpolation frame generation apparatus for generating an interpolation frame image to be inserted between continuous frame images, comprising:
   a motion vector detection module configured to execute block matching processing in each of a plurality of blocks included in the continuous frame images and specify one motion vector on an interpolation frame; and
   a generation module configured to, for an interpolation block in which the motion vector detection module specifies one motion vector, generate an interpolation frame image based on the motion vector, and for an interpolation block in which the motion vector detection module does not specify one motion vector, generate an interpolation frame image based on the frame image containing no motion vector component,
   wherein the motion vector detection module comprises:
      a first detection module configured to divide the frame image into a plurality of first blocks and execute block matching processing in each first block if it is impossible to specify one vector for which a difference between a minimum value and a minimal value of a Sum of Absolute Difference (SAD) value is not more than a predetermined value, determine that no motion vector is detected, and if it is possible to specify one vector for which the difference between the minimum value and the minimal value of the SAD value is not more than the predetermined value, determine that a motion vector is detected; and
      a second detection module configured to, for a block in which the first detection module detects no motion vector, divide the frame image into second blocks smaller than the first block and execute block matching processing in each second block if it is impossible to specify one vector for which the difference between the minimum value and the minimal value of the SAD value is not more than the predetermined value, determine that no motion vector in the second block is detected, and if it is possible to specify one vector for which the difference between the minimum value and the minimal value of the SAD value is not more than the predetermined value, determine that a motion vector of the second block is detected.

3. The apparatus of claim 2, wherein
the second detection module is configured to determine that a motion vector of the second block is detected and, to select a motion vector in the first block by referring to the vector value if it is possible to specify one vector for which the difference between the minimum value and the minimal value of the SAD value is not more than the predetermined value.

4. The apparatus of claim 3, wherein the motion vector detection module comprises:
a third detection module configured to, for a block in which the second detection module detects no motion vector, divide the frame image into third blocks larger than the second block and execute block matching processing in each third block if it is impossible to specify one vector for which the difference between the minimum value and the minimal value of the SAD value is not more than the predetermined value, determine that no motion vector in the third block is detected, and if it is possible to specify one vector for which the difference between the minimum value and the minimal value of the SAD value is not more than the predetermined value, determine that a motion vector of the third block is detected and select a motion vector in the first block by referring to the vector value; and
a fourth detection module configured to, for a block in which the first detection module, the second detection module, and the third detection module detect no motion vector, reconfirm the SAD value of each of the first detection module, the second detection module, and the third detection module and determine whether it is possible to specify one vector for which the difference between the minimum value and the minimal value of the SAD value is not more than the predetermined value.

5. An interpolation frame generation apparatus for generating an interpolation frame image to be inserted between continuous frame images, comprising:
a motion vector detection module configured to execute block matching processing in each of a plurality of blocks included in the continuous frame images and specify one motion vector on an interpolation frame; and
a generation module configured to, for an interpolation block in which the motion vector detection module specifies one motion vector, generate an interpolation frame image based on the motion vector, and for an interpolation block in which the motion vector detection module does not specify one motion vector, generate an interpolation frame image based on the frame image containing no motion vector component,
wherein if an amount of a motion vector in the block in which the motion vector detection module does not specify one motion vector is not less than a predetermined value, the generation module generates, as the interpolation frame image, one of a preceding frame image and a succeeding frame image of the continuous frame images, and if the amount of the motion vector in the block in which the motion vector detection module does not specify one motion vector is less than the predetermined value, the generation module generates, as the interpolation frame image, a frame image obtained by compositing the preceding frame image and the succeeding frame image of the continuous frame images.

* * * * *